United States Patent [19]
Bernardi et al.

[11] Patent Number: 5,931,196
[45] Date of Patent: Aug. 3, 1999

[54] BYPASS VALVE

[75] Inventors: Walter Bernardi, Highland Park; Ronald Matyja, Wheeling, both of Ill.

[73] Assignee: United States Filter Corporation, Palm Desert, Calif.

[21] Appl. No.: 09/067,992

[22] Filed: Apr. 29, 1998

[51] Int. Cl.[6] .................................................. F16K 11/08
[52] U.S. Cl. ................. 137/625.46; 137/625.47
[58] Field of Search .................. 137/626.46, 625.47, 137/599.1

[56] References Cited

U.S. PATENT DOCUMENTS

| | | |
|---|---|---|
| 2,695,036 | 11/1954 | Kronhiem . |
| 2,989,081 | 6/1961 | Olsen . |
| 3,090,396 | 5/1963 | Rudelick . |
| 3,509,998 | 5/1970 | Pellett et al. . |
| 3,570,520 | 3/1971 | Sedi . |
| 3,643,692 | 2/1972 | Traylor . |
| 3,926,071 | 12/1975 | Elliott . |
| 4,278,109 | 7/1981 | Ortega .................................. 137/625.47 |
| 4,469,131 | 9/1984 | Traylor . |
| 4,632,150 | 12/1986 | Gagas . |
| 5,152,321 | 10/1992 | Drager et al. . |
| 5,174,337 | 12/1992 | Dahlen et al. . |

*Primary Examiner*—John Fox
*Attorney, Agent, or Firm*—Greer, Burns & Crain, Ltd.

[57] ABSTRACT

A bypass valve provides an elongated valve body defining a bore and a longitudinal axis. A first pair of axially spaced ports are attached to the valve body and include a service inlet port and a service outlet port. In addition, a second pair of axially spaced ports are attached to the valve body and include a valve inlet port and a valve outlet port. The bypass valve also has an elongated spool with an axis of rotation coinciding with the longitudinal axis while positioned to rotate in the bore between a service position and a bypass position. As part of the spool, a first curved land defines an outlet passage from the valve inlet port to the service outlet port, and a second curved land axially spaced from the first curved land defines an inlet passage from the service inlet port to the valve outlet port. The curved lands define the inlet and outlet passages so that fluid passing through the valve passes directly through a generally central area of the bore without diversion or obstruction by a central axial shaft. A bypass passage is located on the spool opposite the curved lands and is configured to provide fluid communication from the service inlet port to the service outlet port.

20 Claims, 4 Drawing Sheets

BYPASS VALVE

BACKGROUND

The present invention relates generally to a bypass valve of the type used with water softeners, which includes a valve body retaining a spool for alternately connecting feed ports to service ports or connecting adjacent feed ports. More particularly, the present invention relates to a bypass valve and a spool with inlet and outlet passages provided through the radial center of the spool for allowing water to flow through the center of the bypass valve without being obstructed by an impeding center shaft.

Bypass valves are known and used to first connect a water source to a water softener or other water processing device, and second, to connect the water softener to plumbing fixtures for use of the treated water. The known bypass valves have a service side facing the source of untreated water and a valve side facing the water softener. Service ports, located on the service side, include a service inlet connecting the water source to the bypass valve, and a service outlet connecting the bypass valve to the fixture. Similarly, on the valve side, valve ports are known and include a valve outlet carrying untreated water out of the bypass valve and to the water softener, and a valve inlet carrying treated water from the softener to the bypass valve.

In addition, conventional bypass valves also have a bypass passage configured so that water entering the valve through the service inlet can exit the valve through the service outlet, thus skipping treatment by the softener. An example of such a bypass valve is disclosed in U.S. Pat. No. 5,152,321. The use of the bypass valve, which is manually actuated, prolongs the supply of treated softener water when the use of harder water is adequate, such as for watering the lawn or washing a car.

Some known bypass valves use a central shaft that must be moved axially to selectively close and connect pathways. This type of bypass valve, however, requires a complex mechanism to move the shaft and attach the shaft to a body of the bypass valve.

Other conventional bypass valves use a rotating shaft with a number of disks or lands attached to the shaft. The lands and shaft define passages that connect the service ports to valve ports on the opposite side of the central shaft from the service ports. The lands separate the passages on the spool by providing sidewalls for the passages. This configuration, however, necessarily places the shaft in a position that intersects the direct line of flow from the service ports to the valve ports. In other words, the central shaft impedes the flow of water through this type of bypass valve, and in some cases may result in low unusable water pressure at the service outlet.

This conventional configuration is even more detrimental in the type of bypass valve that has the position of an inlet, such as the service inlet, axially offset along a longitudinal or rotational axis of the spool from the exact diametrically opposite position of a corresponding valve outlet on the valve body. In this type of bypass valve, due to the design of the spool and the ports, the valve ports are placed closer together than the service ports. Since these offset flow passages already introduce a pressure drop as a result of the arrangement of the ports, the blockage of direct flow by a central shaft introduces a second loss in pressure.

In addition, bypass valves are also known to have grooves along the outer edge of the lands. O-rings are placed within the grooves to provide a tight seal between the land and the inner surface of the bypass valve body. The typically circular shape of the O-rings tends to limit the land configuration.

Thus, a main object of the present invention is to provide an improved bypass valve that efficiently changes the path of the water without significantly lowering the water pressure.

Another object of the present invention is to provide an improved bypass valve that has a non-circular O-ring that conforms to the shape of a curved land so that the land can be shaped to keep the central portion of the bypass valve open and to prevent impeding the water flow.

A further object of the present invention is to provide an improved bypass valve for disconnecting service ports from valve ports while connecting a bypass passage, which has a simple mechanism for rotating the spool while simultaneously preventing axial movement of the spool.

Yet another object of the present invention is to provide an improved bypass valve that is simple to assemble with a minimum number of components.

SUMMARY OF THE INVENTION

The above-listed objects are met or exceeded by the present bypass valve. Features of the present invention include a valve body with a bore that has generally radially extending service ports diametrically opposite and axially offset from respective valve ports.

In order to maintain water pressure, the present valve includes a spool provided with specially configured lands that both define and separate service and bypass passages in the body of the valve. The lands are designed to avoid the need for an axial support shaft on the spool. In addition, the lands are curved so that no part of the lands blocks the central portion of the spool, which avoids impeding the water flow.

More specifically, the present invention provides a bypass valve that has a valve body and a spool that rotates in the valve body. The spool has a first end, a second end and a pair of opposing "L"-shaped lands disposed in bookend fashion so that the two ends are attached to each other through the pair of lands. This configuration of the lands prevents significant blockage of the water flow in the central area of the valve body.

In another embodiment, the present bypass valve includes an elongated valve body defining a bore and a longitudinal axis. The valve body also has a first pair of axially spaced ports attached to the valve body, which includes a service inlet port and a service outlet port, and a second pair of axially spaced ports attached to the valve body, which includes a valve inlet port and a valve outlet port. An elongated spool is located inside the bore and has an axis of rotation along the longitudinal axis. The spool can be rotated to a service position or a bypass position.

The spool also includes a first curved land, defining an outlet passage, axially spaced from a second curved land, defining an inlet passage. The inlet passage connects the service inlet port to the valve outlet port, and the outlet passage connects the valve inlet port to the service outlet port. Fluid passing through the valve in the outlet and inlet passages passes directly through a generally central area of the bore without diversion or obstruction by a central axial shaft. In addition, a bypass passage is located on the spool opposite the curved lands and is configured for providing fluid communication from the service inlet port to the service outlet port. Rotation of the spool to a service position allows fluid communication between the service and valve ports, and rotation of the spool to the bypass position allows fluid communication through the bypass passage.

In yet another embodiment, the present invention provides an O-ring attached to lands on a spool positioned in a bypass valve. The O-ring has a shape including a first straight side, a second straight side, and a bottom side connected at generally right angles to corresponding ends of the first and second straight sides. An arcuate side, which has a first arc portion with two opposite ends, completes the O-ring by connecting the first straight side to the second straight side.

DESCRIPTION OF THE PREFERRED EMBODIMENT

Figure 1:
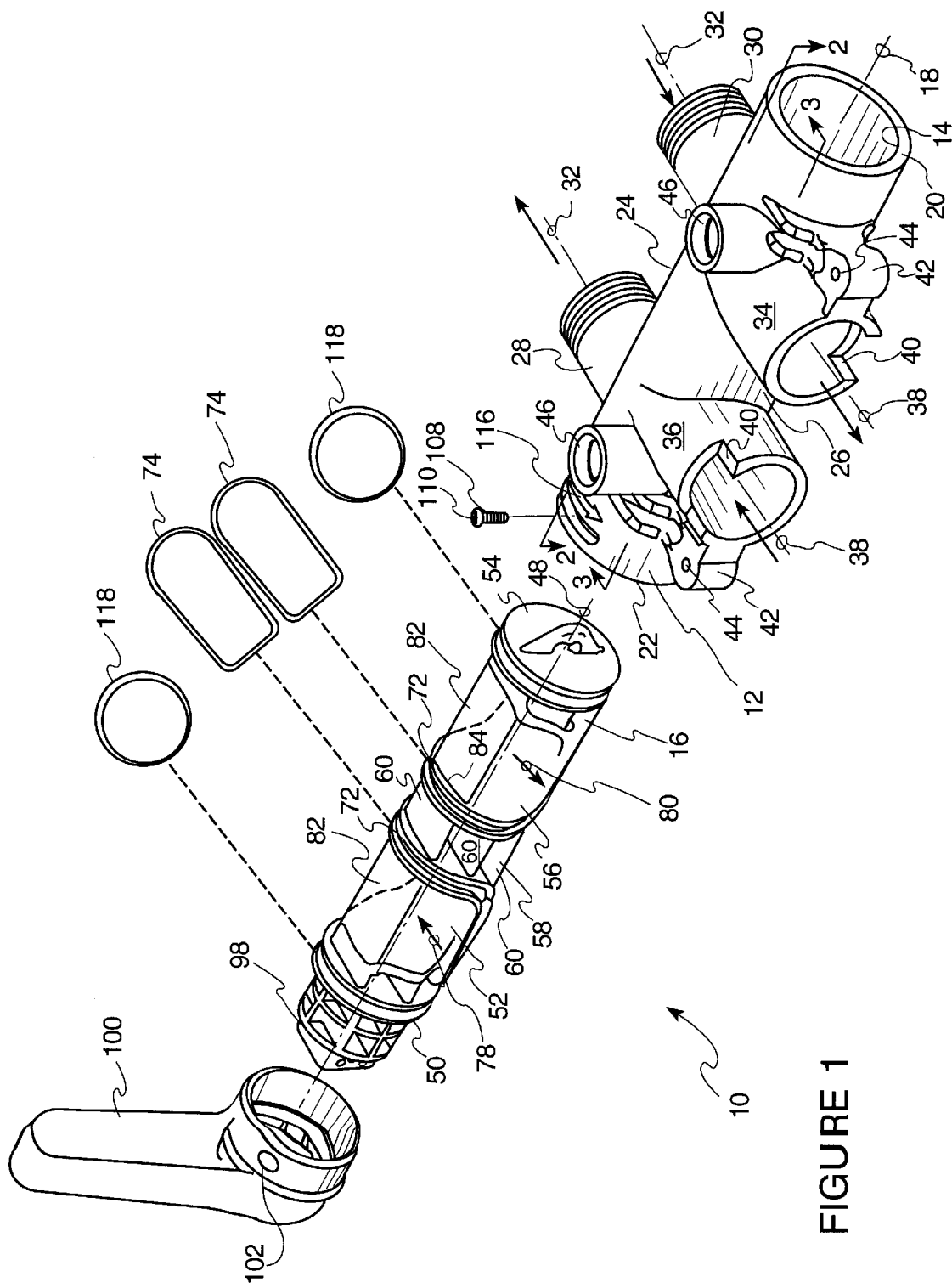
FIG. 1 is an exploded perspective view of the present bypass valve.

Referring now to FIG. 1, a bypass valve is generally designated 10. The bypass valve 10 has an elongated valve body 12 that defines a through bore 14 for holding a rotatable elongated spool 16 as well as a longitudinal axis 18. A pair of open ends 20, 22 are on the valve body 12 in addition to a service side 24 and a valve side 26. A first pair of ports are located on the service side 24 and are designated a service outlet 28 and a service inlet 30. The service outlet 28 is axially spaced from the service inlet 30, and the service ports have generally parallel central axes 32 that are generally perpendicular to the longitudinal axis 18. On the valve side 26, a second pair of ports, including a valve outlet 34 and a valve inlet 36, are positioned diametrically opposite to the first pair of ports 28, 30. The valve outlet 34 is axially spaced from the valve inlet 36, and the central axes 38 of the valve outlet and inlet 34, 36 are also generally parallel to each other and generally perpendicular to the longitudinal axis 18. In the preferred embodiment, the service ports 28, 30, are farther apart from each other in an axial direction on the valve body 12 than are the valve ports 34, 36.

In the preferred embodiment, the service ports 28, 30 are threaded for attachment to hoses or pipes (not shown) as is well known in the art. In addition, the valve ports 34, 36 have strategically located, specially dimensioned notches 40 to ensure that when flow meters (not shown) are used, a flow meter (not shown) can only be placed on the valve inlet 36 of the valve body 12, and a corresponding spacer (not shown) can only be placed on the valve outlet 34 of the valve body 12.

Also shown in FIG. 1, the valve body 12 has a pair of mounting ears 42 for connection to a water conditioning valve (not shown) or other mechanisms for fluid treatment. Holes 44 are provided on the ears 42 for attachment to the water conditioning valve with pins, threaded fasteners, screws or bolts (also not shown).

The valve body 12 also has a pair of blending ports 46 preferably located near the valve ports 34, 36. The blending ports 46 are used to alter the hardness of the treated water by introducing a desired amount of untreated water into the service inlet 30. Since blending ports 46 are mostly used outside the United States, this function is not always necessary. Thus, the blending ports 46 are preferably manufactured with blind ends at the valve body 12. When needed, the ports 46 can be punched or drilled open.

Referring now to the spool 16 shown in FIG. 1, the spool 16 defines a rotational axis 48 that coincides with the longitudinal axis 18 of the valve body 12 when the bypass valve 10 is assembled. The spool 16 has a first spool end 50 connected to a first curved land 52, and a second spool end 54 connected to a second curved land 56. Both curved lands 52, 56 are attached to a central spool portion 58 (also called the central support portion) so that the two curved lands are situated in bookend fashion with the central spool portion positioned between the curved lands. Three generally parallel, slat-like members 60 form the central spool portion 58.

Figure 2:
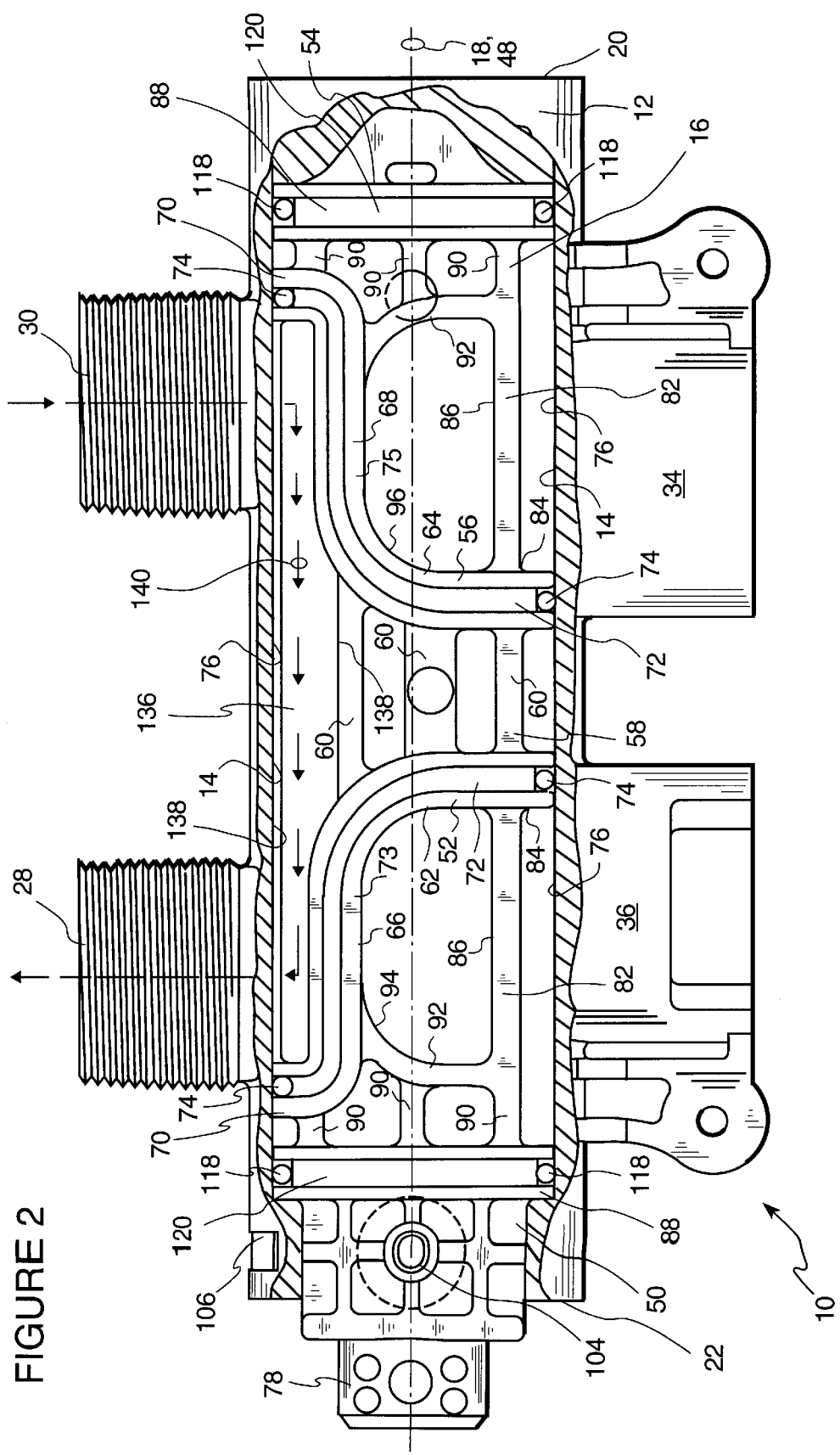
FIG. 2 is an assembled top view of the present valve with the body of the valve sectioned along the line 2—2 of FIG. 1 to show the spool in a bypass position.

As best seen in FIG. 2, the curved lands 52, 56 are preferably "L"-shaped, with shorter legs 62, 64 of the "L's" attached to the central portion 58 and longer legs 66, 68 of the "L's" lying generally parallel to the rotational axis 48. "Free" ends 70 of the longer portions 66, 68, have an angled lip that forms an end of the curved lands 52, 56 projecting generally perpendicular to the through bore 14. The curved lands 52, 56 also include grooves 72 preferably integrally formed along the periphery 73, 75 of the curved lands. Angling the lip 70 causes contact between a keyhole shaped O-ring 74 in the groove 72 and an inner surface 76 of the through bore 14.

As depicted by the arrows 78, 80 on the spool 16 in FIG. 1, the first curved land 52 also defines part of the surface of an outlet passage 78, and the second curved land 56 defines part of a surface of an inlet passage 80. The open space defined by the passages 78, 80 intersects the rotational axis 48 and allows fluid to flow directly through a rotational center of the spool 16 instead of being obstructed or diverted by a central shaft. This configuration maintains pressure and flow much more efficiently than conventional valves requiring a central, axial shaft.

Referring again to FIG. 1, axial braces 82 are also included as a further preferred feature of the spool 16. The axial braces 82 each connect the spool ends 50, 54 to corresponding near peripheral points 84 of the curved lands 52, 56 for further stabilization of the spool 16. In some applications, the braces 82 may not be required. To prevent blocking the passages 78, 80, the braces 82 define a bridge between the curved lands 52, 56 and the spool ends 50, 54 (best seen in FIG. 2). Thus, undersides of the braces 82 also define surfaces 86 of the outlet and inlet passages 78, 80 so that the surfaces are spaced in parallel relationship to the longer legs 66, 68 of the curved lands 52, 56.

The spool ends 50, 54 also include generally circular discs 88 respectively attached to three generally parallel, slat-like members 90, which, in turn, support side walls 92 of the outlet and inlet passages 78, 80 (best seen in FIG. 2). To further maintain even flow, the side walls 92 are preferably curved symmetrically relative to the curve 94, 96 in the curved lands 52, 56.

Referring now to FIGS. 1 and 2, the first spool end 50 has a block end 98 for engaging a mechanism to rotate the spool 16 to the bypass position or service position. Preferably, a handle 100 is designed to engage the block end 98, although other devices that manually or automatically rotate the spool 16 are contemplated. The handle 100 has a second hole 102 that aligns with a first hole 104 on the first spool end 50 (as shown in FIG. 2) and also aligns with a slot 106 on the valve body 12 (best seen in FIGS. 1 and 3). While other fasteners such as bolts, pins, pegs, nails or any equivalent fastener that secures the handle to the spool are contemplated, a threaded fastener 108 is preferably inserted through the second hole 102 and the slot 106 and is fixed in the first hole 104. This configuration of fastener, holes and slot, in the preferred embodiment, also prevents the axial movement of the spool as a head 110 of the fastener 108 is retained within the slot 106.

Figure 3:
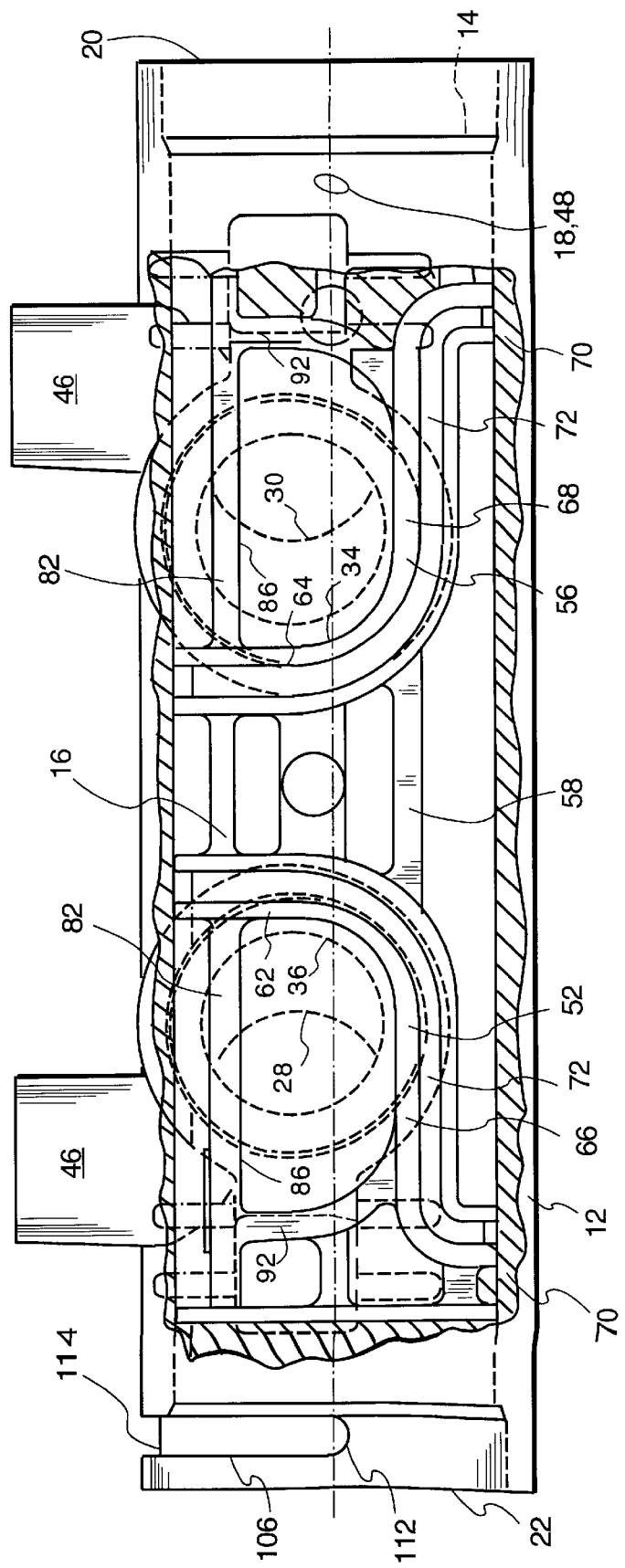
FIG. 3 is an assembled side view of the present bypass valve with the body of the valve sectioned along the line 3—3 of FIG. 1 to show the spool in a service position.

Furthermore, referring to FIG. 3, while placing the fastener 108 at one end 112 of the slot 106 defines the bypass position, the service position actually includes all of the intermediate positions of the fastener 108. This occurs because movement away from the bypass position gradually increases the area for flow in the outlet and inlet passages 78, 80. A maximum flow position is reached when the fastener 108 is at an opposite end 114 of the slot 106 from the bypass position end 112. At least one arrow 116 (as shown in FIG. 1) is preferably molded on the face of the valve body 12 to provide the user with directions for the positions of the spool 16.

Referring now to FIG. 1, it will be appreciated that the spool 16 is dimensional to snugly slide within the through bore 14. To seal the various passages, four O-rings are seated in four grooves formed by the spool 16. Each member of a pair of circular O-rings 118 is placed in a corresponding circular groove 120, preferably integrally formed along the periphery of the discs 88. Each member of a pair of the keyhole-shaped O-rings 74 is designed to be engaged tightly, frictionally in the corresponding groove, preferably integrally formed along the periphery 73, 75 of the curved lands 52, 56 to maintain a seal between the entire periphery of the curved lands 52, 56 and the inner surface 76 of bore 14.

Figure 4:
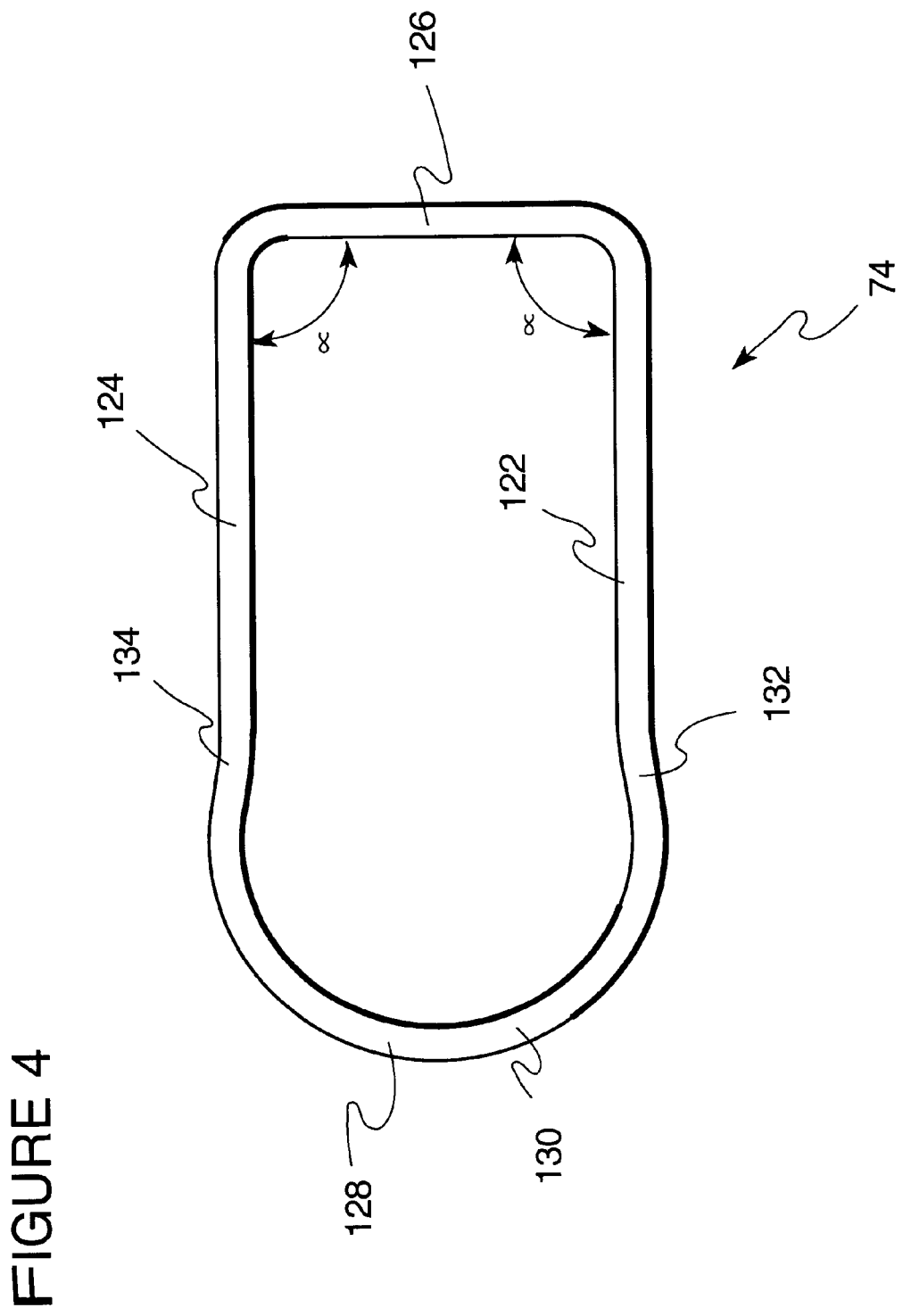
FIG. 4 is an overhead plan view of the O-ring used in the present bypass valve.

Referring now to FIG. 4, to retain the O-rings 74 seated in the grooves 72, the O-rings are keyhole-shaped with a first straight side 122 and a second straight side 124, both attached to opposite ends of a bottom side 126. Generally right angles a are formed between the bottom side 126 and both first and second straight sides 122, 124. In addition, the first straight side 122 is also connected to the second straight side 124 through an arcuate side 128, which completes the O-ring 74. The arcuate side 128 preferably includes three arc portions 130, 132 and 134, where the arc portions 132, 134 are at ends of the arc portion 130 and attach the arc portion 130 to the straight sides 122, 124. The O-rings 74 provide tight seals to prevent leakage past the curved lands 52, 56. More specifically, it has been found that the right angles a are helpful in securing the O-rings 74 near the angled lip 70. Friction caused by rotation of the spool 16 in the bore 14 may be reduced by lubricating the O-rings 74

Referring now to FIG. 2, an upper portion of the valve body 12 is cut away to reveal the spool 16 in the bypass position. In this position, the service ports 28, 30 are closed off from the valve ports 34, 36 and the outlet and inlet passages 78, 80 (here shown coming out of the paper) are positioned generally perpendicular to the service and valve ports. A bypass passage 136 is located on the opposite side of the curved lands 52, 56 from the outlet and inlet passages 78, 80. The central spool portion 58 defines a middle portion 138 of the bypass passage 136, while the bore 14 forms a wall 138 parallel to the longer legs 66, 68 of the lands 52, 56 and the central portion 58. In the bypass position, the fluid flows into the service inlet 30, through the bypass passage 136 and then out the service outlet 28, as shown by the arrows 140 in FIG. 2.

Referring now to FIG. 3, a front portion of the valve body 12 is cut away to reveal the spool 16 in the service position. Both the valve ports 34, 36 and the service ports 28, 30, shown hidden, intersect the longitudinal and rotational axes 18, 48. While FIG. 3 depicts the service ports 28, 30 as spaced farther apart axially than the axial spacing between the valve ports 34, 36, overlap of the opening of the service port with the corresponding valve port still exists, creating offset flow passages. The amount of overlap can vary depending on the application. With the present configuration, the spool 16 and valve body 12 provide a relatively unobstructed passage between service port (28 or 30) and the respective valve port (34 or 36) directly through the rotational axis 48.

Each separate component of the bypass valve 10, including the valve body 12, the spool 16 and the handle 100, is preferably integrally formed by molding with NORYL® glass-filled resin produced by G.E. Plastics Div. of General Electric Co. of Pittsfield, Mass. Other resins, plastics or metals are contemplated as long as the material has comparable properties of chemical resistance, corrosion resistance and strength.

While a particular embodiment of the bypass valve of the invention has been shown and described, it will be appreciated by those skilled in the art that changes and modifications may be made thereto without departing from the invention in its broader aspects and as set forth in the following claims.

What is claimed is:

1. A bypass valve, comprising:
   a valve body; and
   a spool with a first spool end, a second spool end and a pair of opposed "L" shaped lands disposed in book end fashion so that said first end and said second end are attached to each other through said lands, said spool being rotatably positioned in said valve body.

2. The bypass valve according to claim 1, wherein said spool further includes a central support portion that is disposed between said lands to connect said lands to each other.

3. The bypass valve according to claim 1, wherein said valve body further includes a pair of service ports and a pair of valve ports, and wherein said spool further includes a pair of braces, each said brace being attached to a corresponding land and a corresponding end of said spool, each said attached brace, land and end of said spool being disposed to define the periphery of a passage connecting said service ports to said valve ports, said passages generally passing through the rotational axis of said spool.

4. The bypass valve according to claim 1, further including a bypass passage defined between a first surface formed by a first brace of said pair of braces, said central section and a second brace of said pair of braces, and a second surface formed by said valve body.

5. The bypass valve according to claim 1, further comprising at least two O-rings, and wherein each said "L" -shaped land further includes a periphery and a groove along said periphery, each said O-ring being positioned in one of said grooves.

6. The bypass valve according to claim 5, wherein each said O-ring is formed to define at least one generally right angle, and wherein each said groove further includes a generally right angle configured to receive said right angle of said O-ring.

7. The bypass valve according to claim 1, wherein each said "L" -shaped land includes a short leg and a long leg, each said long leg having a free end with an angled lip.

8. The bypass valve according to claim 1, further including a fastener and said spool further includes a first hole near said first spool end, said valve body further includes a first body end, a second body end and a slot near said first valve end positioned to correspond to said first hole, said fastener being configured to be secured in said first hole and slidably engaged in said slot to control the amount of axial movement of said spool in said valve body.

9. The bypass valve according to claim 8, further including rotating means for rotating said spool, said rotating means including a handle attached to said first spool end and having a second hole disposed so that said fastener attaches said handle to said first spool end through said second hole and through said slot.

10. The bypass valve according to claim 8, wherein said slot further includes a first end that corresponds to said bypass position when said fastener engages said first end of said slot, and a second end that corresponds to said service position as said fastener engages said second end of said slot.

11. The bypass valve according to claim 1, wherein said valve body further includes a pair of blending ports.

12. The bypass valve of claim 1, wherein said spool is formed as a single molded article.

13. A bypass valve, comprising:
an elongated valve body defining a bore and a longitudinal axis;
a first pair of axially spaced ports attached to said valve body and including a service inlet port and a service outlet port;
a second pair of axially spaced ports attached to said valve body and including a valve inlet port and a valve outlet port;
an elongated spool having an axis of rotation on said longitudinal axis and being rotatably positioned in said bore between a service position and a bypass position, said spool including:
a first curved land defining an outlet passage from said valve inlet port to said service outlet port;
a second curved land axially spaced from said first curved land and defining an inlet passage from said service inlet port to said valve outlet port;
said curved lands defining said inlet and outlet passages so that fluid passing through said valve passes directly through a generally central area of said bore without diversion or obstruction by a central axial shaft; and
a bypass passage on said spool opposite said curved lands and configured for providing fluid communication from said service inlet port to said service outlet port.

14. The valve according to claim 13, further including means for rotating said spool between said service and said bypass positions, said spool being configured so that rotation of said spool to said service position allows fluid communication between said service and valve ports, and rotation of said spool to said bypass position allows fluid communication through said bypass passage.

15. The bypass valve according to claim 13, wherein said spool further includes a first spool end, a second spool end and a central spool portion, said first curved land having a first end attached to said first spool end and a second end attached to said central spool portion, and said second curved land having a first end attached to said central spool portion and a second end attached to said second spool end.

16. The bypass valve according to claim 13, wherein said spool further includes a pair of axial braces, each said brace having a first end attached to one of said spool ends and a second end attached to a periphery of one of said lands, each said brace forming a bridge from a corresponding said land to said spool end, said braces further defining a surface of said outlet and inlet passages disposed in spaced parallel relationship to surfaces of said inlet and outlet passages defined by said lands.

17. The bypass valve according to claim 13, wherein said spool is configured so that once in said bypass position, said inlet and said outlet passages defined on said spool are rotated to be generally perpendicular to said first and second pairs of ports.

18. The bypass valve according to claim 13, wherein said first pair of ports is spaced axially apart from each other a greater distance than said second pair of ports to create offset flow passageways.

19. An O-ring attached to at least one "L" shaped land of a pair of opposed "L" shaped lands disposed in bookend fashion on a spool so that the first end of the spool and the second end of the spool are attached to each other through the lands, the spool being rotatably positioned in the valve body in a bypass valve, the O-ring comprising:
a first straight side;
a bottom side attached to said first straight side to form a generally right angle;
a second straight side attached to said bottom side to form a generally right angle; and
an arcuate side including a first arc portion with two opposite ends and connecting said first straight side to said second straight side.

20. The O-ring according to claim 19, wherein said arcuate side further includes second and third arc portions, said second and third arc portions being attached on said opposite ends of said first arc portion.

* * * * *